US012572138B2

(12) United States Patent
      Shimizu

(10) Patent No.: US 12,572,138 B2
(45) Date of Patent: Mar. 10, 2026

(54) FAILURE FACTOR PRIORITY ORDER CALCULATION DEVICE AND METHOD BASED ON USE ENVIRONMENT

(71) Applicant: Hitachi, Ltd., Tokyo (JP)

(72) Inventor: Yuuki Shimizu, Tokyo (JP)

(73) Assignee: HITACHI, LTD., Tokyo (JP)

( * ) Notice: Subject to any disclaimer, the term of this patent is extended or adjusted under 35 U.S.C. 154(b) by 468 days.

(21) Appl. No.: 18/021,345

(22) PCT Filed: Apr. 14, 2021

(86) PCT No.: PCT/JP2021/015382
     § 371 (c)(1),
     (2) Date: Feb. 14, 2023

(87) PCT Pub. No.: WO2022/054329
     PCT Pub. Date: Mar. 17, 2022

(65) Prior Publication Data
     US 2023/0297094 A1      Sep. 21, 2023

(30) Foreign Application Priority Data

Sep. 14, 2020    (JP) ................................. 2020-153823

(51) Int. Cl.
     *G05B 23/02*          (2006.01)
(52) U.S. Cl.
     CPC ....... *G05B 23/0229* (2013.01); *G05B 23/024* (2013.01); *G05B 23/0251* (2013.01)

(58) Field of Classification Search
     CPC .............. G05B 23/0229; G05B 23/024; G05B 23/0251; G05B 23/0278; G05B 19/418; Y02P 90/02; G06Q 10/00
     See application file for complete search history.

(56) References Cited

U.S. PATENT DOCUMENTS

| | | | |
|---|---|---|---|
| 6,785,636 | B1 | 8/2004 | Darken et al. |
| 2024/0273444 | A1* | 8/2024 | Alghamdi ........ G06Q 10/06393 |
| 2025/0111103 | A1* | 4/2025 | Shimizu .................. G06F 30/20 |

FOREIGN PATENT DOCUMENTS

| | | | | |
|---|---|---|---|---|
| EP | 3477487 | A1 * | 5/2019 | ........... G06F 18/214 |
| JP | 2000-356696 | A | 12/2000 | |
| JP | 2017-111657 | A | 6/2017 | |
| JP | 2017-194727 | A | 10/2017 | |
| JP | 2020-057192 | A | 4/2020 | |

OTHER PUBLICATIONS

International Search Report of PCT/JP2021/015382 dated Jul. 6, 2021.

* cited by examiner

*Primary Examiner* — Mi'schita' Henson
(74) *Attorney, Agent, or Firm* — MATTINGLY & MALUR, PC

(57) ABSTRACT

Automatically generating a fault tree on the basis of the causal relationship of defects to events to be analyzed, and calculating a priority degree (score) for the individual events in the generated fault tree by means of the number of co-occurrences of "events" and "event-related information" in past defect information on the basis of "event-related information" in which a component is used. A scored fault tree to which the scores have been applied is presented.

8 Claims, 13 Drawing Sheets

| | | |
|---|---|---|
| 301 | | |
| DEFECT NAME | PRODUCT STOP OF XX PRODUCT DUE TO CAPACITOR RUPTURE | 302 |
| COURSE UNTIL OCCURRENCE OF DEFECT | YEAR 200X: INSTALLATION OF XX PRODUCT<br>YEAR 200X: START OF SERVICE OF XX PRODUCT<br>YEAR 200X: DEFECT OCCURRED AND PRODUCT WAS STOPPED<br>YEAR 200X: FAILURE COMPONENT HAS BEEN REPLACED WITH SUBSTITUTE, AND RECOVERY HAS BEEN DONE | 303 |
| PHENOMENON | UNDER USE IN HIGHLY HUMID ENVIRONMENT, CAPACITOR RUPTURED IN SUBSTRATE MOUNTED ON XX PRODUCT, AND PRODUCT WAS STOPPED | 304 |
| CAUSE | CAPACITOR GENERATED HEAT ON SUBSTRATE, AND CAPACITOR RUPTURED | 305 |
| MEASURE | SPECIFICATIONS HAS BEEN CHANGED SO THAT CAPACITOR DOES NOT GENERATE HEAT | 306 |
| . . . | | |

SCORE CALCULATION

FIELD                    Y FIELD              407

PRODUCT                  XX DEVICE            408

USE ENVIRONMENT          HIGH HUMIDITY        409

INFLUENCE DEGREE         PRODUCT STOP         410

OTHERS
(FREE INPUT)                                  411

SCORE CALCULATION   ☑   412

SCORE CALCULATION OPTION                      413

|  | AND | OR |
|---|---|---|
| WITHOUT CONSIDERATION FOR HIERARCHY | ⦿ | ○ |
| WITH CONSIDERATION FOR HIERARCHY | ○ | ○ |

FIG. 6
(a)
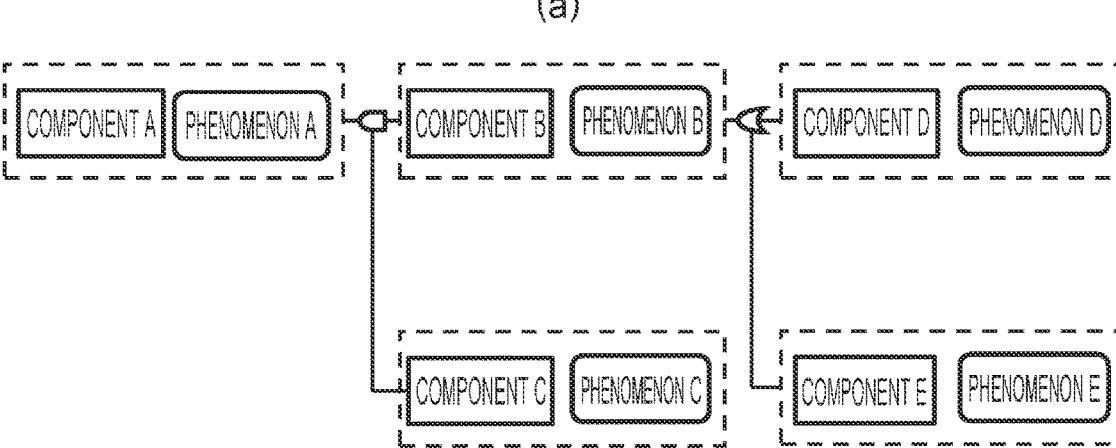
(b)
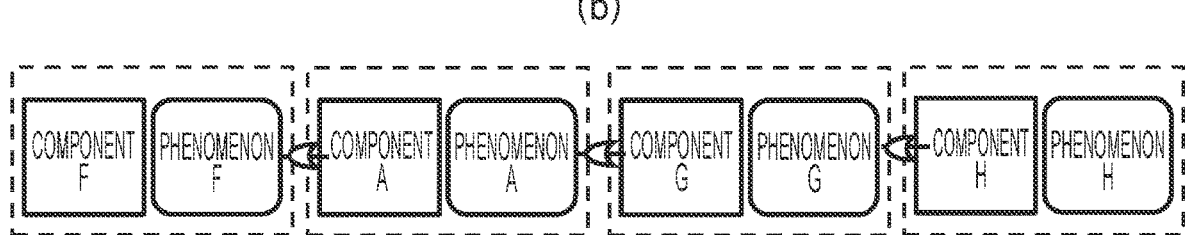

*FIG. 7*
(a)
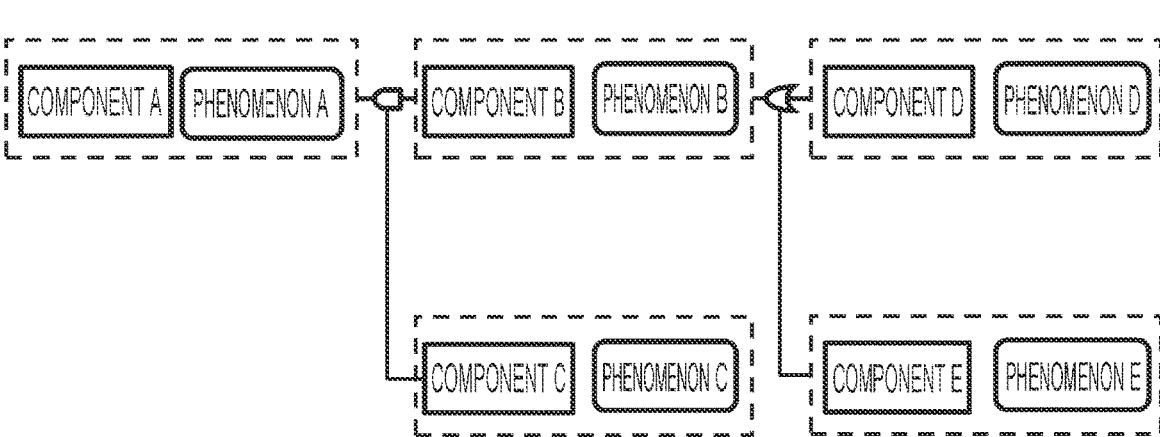
(b)
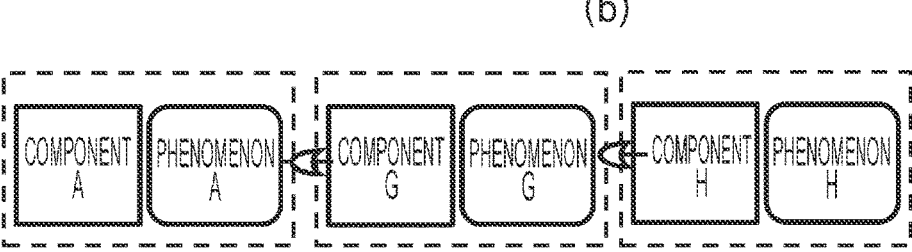

1101

1104       1105       1106

CENTRAL
CONTROL DEVICE

INPUT
DEVICE

OUTPUT
DEVICE

1107

1108

MAIN STORAGE
DEVICE

AUXILIARY STORAGE DEVICE

1109

COMPONENT
EXTRACTION PART

1114

CAUSAL
RELATIONSHIP
DATABASE

1110

FIELD/PRODUCT/USE
ENVIRONMENT/INFLUENCE
DEGREE EXTRACTION PART

1115

DEFECT
INFORMATION
DATABASE

1111

FAULT TREE
GENERATION PART

1112

SEARCH ENGINE

1113

SCORE CALCULATION PART

1102

1103

FAILURE FACTOR PRIORITY ORDER CALCULATION DEVICE AND METHOD BASED ON USE ENVIRONMENT

TECHNICAL FIELD

The present invention relates to a technique for presenting failure factor priority order for responding to a failure of a product including a component. In the technique, the present invention particularly relates to a technique for evaluating priority on the basis of a use environment of a target component for a failure factor included in a fault tree. Note that the failure in the present description means hindrance of execution of an assumed function, such as damage, abnormality, breakage, destruction, deterioration, and defect. Further, the product is a subject of the present invention including at least one component, and any expression, such as equipment, machine, facility, or the like may be used.

BACKGROUND ART

As a method for preventing the failure of the product, there is fault tree analysis (FTA). FTA is an analysis technique for systematically searching for a source of a defect of the product by taking up a defect event of the product and sequentially identifying and developing failure factors in a hierarchical manner. This analysis result has a tree structure in which a defect event of the product is at the top and a failure factor is in a lower hierarchy. This analysis result having a tree structure is referred to as a fault tree. A defect event of the product to be analyzed is called a top event because the event is located at the top of the fault tree. The fault tree includes a plurality of hierarchies. A failure factor at the end of the fault tree is called an end event because the factor is located at the end of the fault tree. An end event represents a root cause of a top event. An event in an intermediate hierarchy of a top event and an end event is referred to as an intermediate event.

For example, in a case where a defect factor of a certain system is analyzed, a defect event of the system is described as a top event, and then damage of a subsystem that is a factor of the defect of the system is identified and described in a lower hierarchy of the top event. Subsequently, the failure of a component that is a factor of the damage of the subsystem is identified and described in a lower hierarchy of a failure factor of the subsystem. In this way, a root cause, that is, a failure factor is identified up to an end event.

FTA can be used in a case of improving product reliability at a design stage and in a case of investigating a factor in a case where a defect occurs in the product. In the case of use at a design stage, a defect event that is not desired to occur in the product is set as a top event, and measures are taken to prevent occurrence of an end event that is a root cause obtained as an analysis result, so as to improve reliability. In defect factor analysis after occurrence of a defect, a defect event that has occurred is set as a top event, FTA is performed to check whether an end event is actually a failure factor of the top event.

At this time, in a case where there are many intermediate events and end events that are identified, it is more efficient to place priority and consider the events with higher priority.

In PTL 1, a defect causal relationship is expressed by a Bayesian network, and priorities of events (defect causes) are presented according to probabilities in the Bayesian network.

CITATION LIST

Patent Literature

PTL 1: JP 2000-356696 A

SUMMARY OF INVENTION

Technical Problem

The priority of an event varies depending on a field, a product, a use environment, an influence degree, and the like in which a component is used. For example, likelihood of occurrence of each event differs between a case where a component is used indoors and a case where a component is used outdoors. When a component is used outdoors, events caused by a use environment such as humidity, temperature, or dust are more likely to occur, and the priority of these events is higher. Further, when FTA is used to improve product reliability at a design stage, influence degree of each event on the entire product is also an important viewpoint in determining the priority order. For example, in a case where the product is stopped when a certain event occurs, it is necessary to preferentially take measures against the event, and the priority of the event becomes high.

In the technique of PTL 1, it is necessary to create a Bayesian network covering all combinations of fields, products, and use environments in which a component is used, and there is a problem that man-hours are required for the creation. Further, influence degree of an event is not taken into consideration.

In view of the above, an object of the present invention is to evaluate priority for an event included in a fault tree in consideration of a field, a product, a use environment, an influence degree, and the like in which a component is used without constructing a model such as a Bayesian network for each field, product, use environment, and influence degree.

Solution to Problem

In order to solve the above problem, a score for an event to be analyzed is calculated. Here, the score is information indicating priority of a response to a failure. Further, one aspect of the present invention also includes generation of a fault tree indicating a hierarchical relationship with respect to a failure, and, for each event of the fault tree, calculation of priority (score) from the number of co-occurrences of an event in past defect information and information related to the event on the basis of information related to events such as a field, a product, a use environment, and influence degree in which a component is used. Here, the number of co-occurrences refers to the number of items in which keywords are described together in one document. Here, the keyword is an event or information related to the event.

A more detailed configuration of the present invention is a failure factor priority order calculation device for analyzing a failure factor in a product, the failure factor priority order calculation device including an input part that receives, for each component constituting the product, input of a plurality of events including the component and a phenomenon occurring in the component or including the component, and receives information related to an event in each of the components, a fault tree generation part that generates a fault tree indicating a hierarchical relationship between a plurality of the events related to the product, and a score calculation part that calculates, for each event constituting the fault tree, a score indicating priority of a response to the event according to the information related to the event.

Further, the present invention also includes a failure factor priority order calculation method using the failure factor priority order calculation device, a program for causing the failure factor priority order calculation device to function as a computer, and a storage medium storing the program.

Advantageous Effects of Invention

According to the present invention, it is possible to more easily determine the priority order for responding to a failure occurring in a product.

BRIEF DESCRIPTION OF DRAWINGS

FIG. 3 is a diagram illustrating an example of defect information.

FIG. 5 is a diagram illustrating an example of a fault tree without a score and a fault tree with a score.

FIG. 6 is a diagram illustrating an example of a search result when a causal relationship DB is searched using a top event as a search keyword.

FIG. 7 is an example of a result of extracting a causal relationship up to a top event from retrieved causal relationships.

DESCRIPTION OF EMBODIMENTS

Hereinafter, embodiments for carrying out the present invention will be described in detail with reference to the drawings.

First Embodiment

Hereinafter, a first embodiment will be described.
(Device Configuration)

First, a configuration of a failure factor priority order presentation device 101 based on a use environment (hereinafter, the failure factor priority order presentation device 101) in the first embodiment will be described with reference to FIG. 1. Note that, in the present embodiment, the failure factor priority order presentation device 101 is used, but this may be realized as a failure factor priority order calculation device that performs up to calculation of priority order (score).

Figure 1:
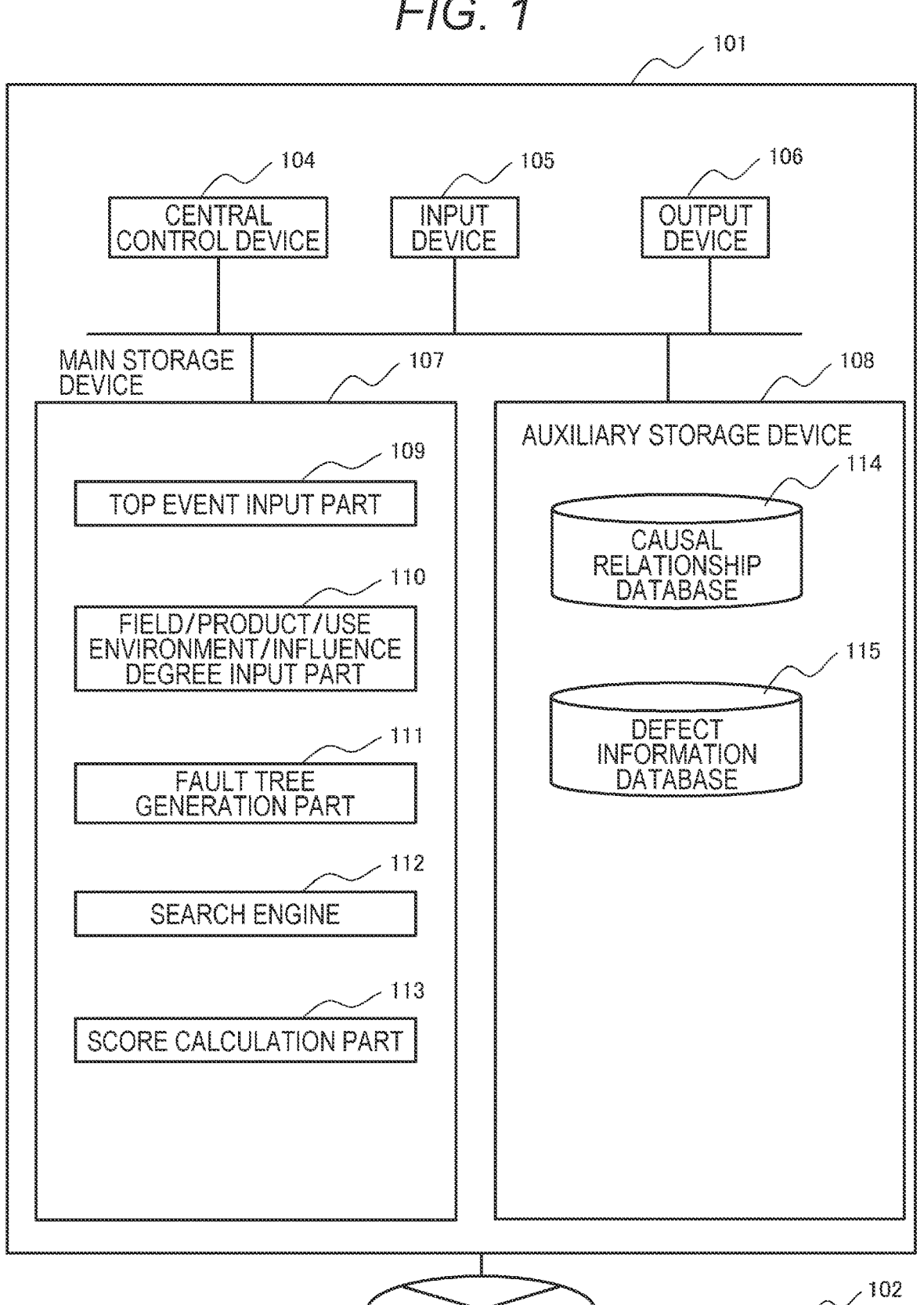
FIG. 1 is a diagram explaining a configuration of a failure factor priority order presentation device based on a use environment according to a first embodiment.

FIG. 1 illustrates the failure factor priority order presentation device 101 and a terminal device 102. These can be connected via a network 103. The failure factor priority order presentation device 101 is a general computer, and includes a central control device 104, an input device 105, an output device 106, a main storage device 107, and an auxiliary storage device 108. These are mutually connected by a bus. The auxiliary storage device 108 stores a causal relationship database 114 and a defect information database 115. A causal relationship of a defect is modeled and accumulated in the causal relationship database 114. Defect information is accumulated in the defect information database 115. Details of the causal relationship database 114 and the defect information database 115 will be described later. Note that, hereinafter, these are abbreviated as a causal relationship database (DB) 114 and the defect information DB 115.

Note that a configuration in which the auxiliary storage device 108 is an external storage device independent of the failure factor priority order presentation device 101 and both are connectable via the network 103 can also be employed.

A top event input part 109, a field/product/use environment/influence degree input part 110, a fault tree generation part 111, a search engine 112, and a score calculation part 113 in the main storage device 107 are programs. Hereinafter, when a subject is described as "XX part", the central control device 104 reads each program from the auxiliary storage device 108, loads the program into the main storage device 107, and then realizes a function (described later in detail) of each program. However, "XX part" may be realized by hardware.

The top event input part 109 receives input of a top event to be analyzed of a fault tree from the user.

The field/product/use environment/influence degree input part 110 receives input of a field, a product, a use environment, and influence degree in which a component is used by the user. The fault tree generation part 111 generates a fault tree for a top event input in the top event input part 109 using a causal relationship registered in the causal relationship DB 114. When a search condition is input, the search engine 112 searches the defect information DB 115 and outputs the number of pieces of defect information matching the search condition. The score calculation part 113 calculates, as a score, the number of co-occurrences of an "event" and "information related to an event" input in the field/product/use environment/influence degree input part 110 for each event in the fault tree generated by the fault tree generation part 111. It is then possible to present a score-attached fault tree. Specifically, as a search condition using an "event" and "information related to an event" is generated and input to the search engine 112, the defect information DB 115 is searched and the number of pieces of defect information matching the search condition as is acquired as the number of co-occurrences. Details of the search condition and the like will be described later.

The terminal device 102 is also a general computer, and includes a central control device, an input device, an output device, a main storage device, and an auxiliary storage device (not illustrated). These are mutually connected by a bus.
(Causal Relationship)

The causal relationship DB 114 stores a causal relationship. The causal relationship represents a chain of causalities leading to occurrence of a defect. This causal relationship is created using information extracted from each defect case that has occurred in the past.

Figure 2:
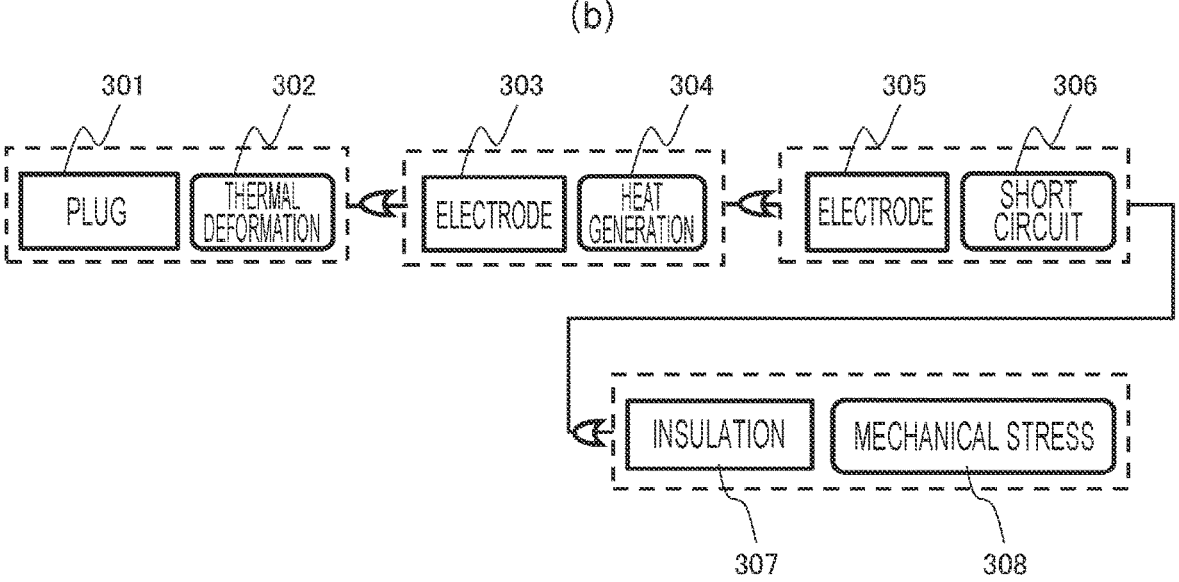
FIG. 2 is a diagram illustrating a configuration and an example of a causal relationship of a defect.

FIG. 2(a) illustrates an example of a causal relationship. An individual element 201 constituting a causality includes a component 202 and a phenomenon 203. These elements are expressed in the order of causalities in a row. In the example of FIG. 2(a), a right element causes a left element. As a relationship connecting the elements, there are an AND condition 204 and an OR condition 205. The AND condition 204 indicates that the right element is caused when all connected elements occur. The OR condition 205 indicates that the right element is caused when any one of the connected elements occurs.

Note that this element can be expressed as an event. Further, the component constitutes a product, and the phenomenon is information indicating failure site content, and includes code information such as what is called a "failure mode".

In the example of FIG. 2(a), a phenomenon D 209 occurs in a component D 208, or a phenomenon E 211 occurs in a component E 210, so that a phenomenon B 207 occurs in a component B 206. Furthermore, a phenomenon B 207 occurs in a component B 206, and a phenomenon C 213 occurs in a component C 212, so that a phenomenon A 203 occurs in a component A 202.

For each causal relationship stored in the causal relationship DB 114, an ID 214 is assigned in advance in order to identify each causal relationship.

The causal relationship illustrated in FIG. 2(a) is in a format close to a result of FTA in that elements constituting a causality are connected by an AND condition and an OR condition. However, as a characteristic of a causal relationship in the present embodiment, each element constituting a causality is described as a set of a component and a phenomenon occurring in the component.

It is assumed that a large number of causal relationships of past defects are accumulated in the causal relationship DB 114 in such a form.

FIG. 2(b) illustrates an example of a causal relationship. This example shows that mechanical stress is generated in an insulation, a short circuit occurs in an electrode, the electrode generates heat, and finally, thermal deformation occurs in a plug.

(Defect Information)

Defect information 301 is information describing a defect of a product that has occurred in the past as illustrated in FIG. 3 in a sentence for each item, and includes, for example, a report. Specifically, the defect information includes, as items, a defect name 302, a course 303 until occurrence of a defect, a phenomenon 304 (of a defect), a cause 305 (of a defect), and a measure 306 (against a defect). Then, each item has a sentence (character string). In the course 303 until occurrence of a defect and the phenomenon 304, what kind of influence has finally occurred in the product such as product stop is described. It is assumed that a large amount of the defect information 301 is accumulated in the defect information DB 115 in this manner.

(Entire Processing Process)

Figure 13:
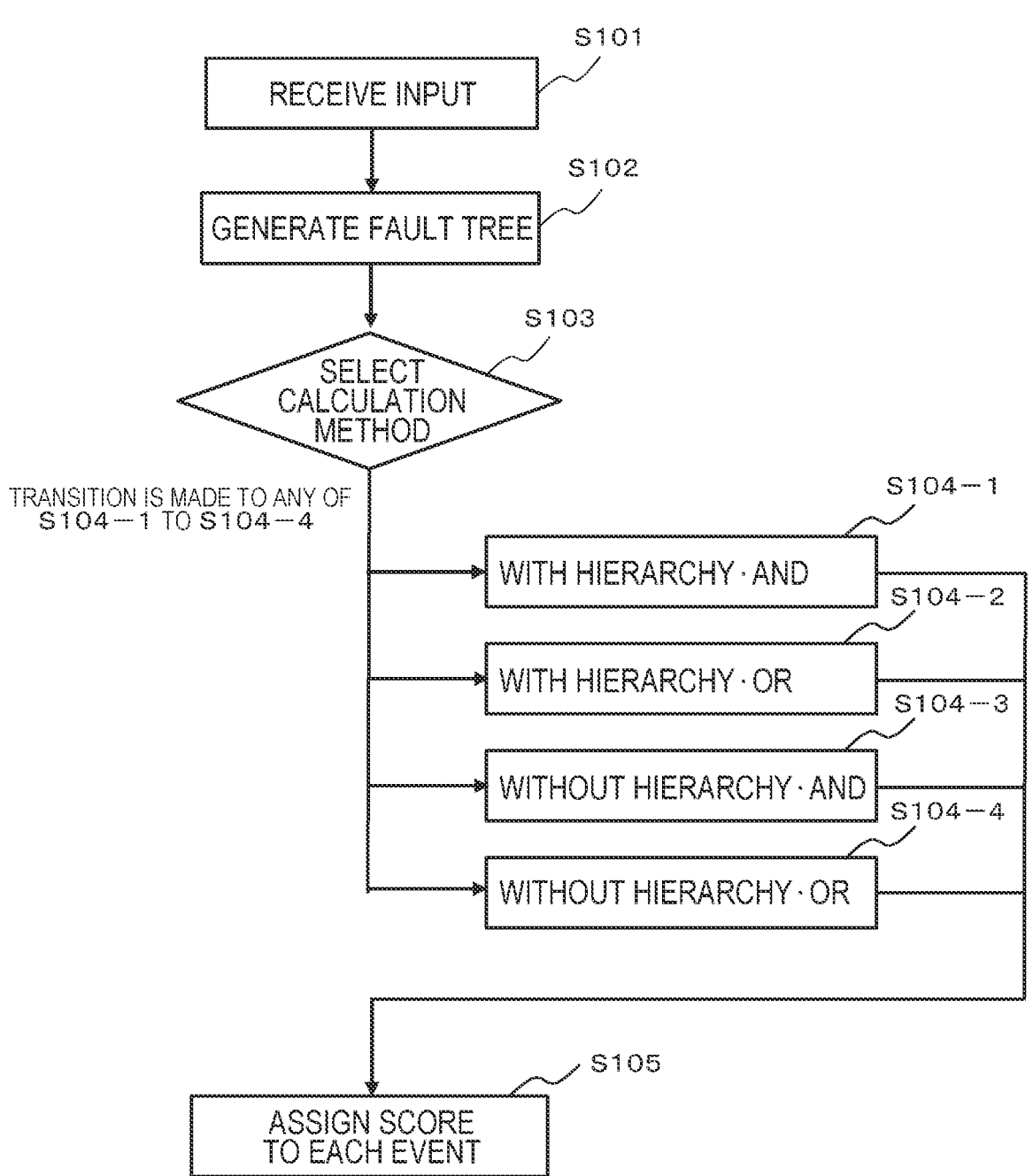
FIG. 13 is a flowchart illustrating an entire processing process of the first embodiment.

Here, an overview of the entire processing process of the present embodiment will be described. Then, after that, details of each processing step will be described. FIG. 13 illustrates the entire processing process of the present embodiment.

First, in Step S101, the input device 105 receives input of an event and a field by the user. Next, in Step S102, the fault tree generation part 111 generates a fault tree using the event input in Step S101.

Next, in Steps S103 to S104, the score calculation part 113 calculates a score for each event using the fault tree generated by the fault tree generation part 111 and the field input by the user. Specifically, in Step S103, the score calculation part 113 selects a calculation method (condition) according to a predetermined condition. Then, the processing proceeds to any one of Steps S104-1 to S 104-4 according to this selection, and the score calculation part 113 calculates a score using the fault tree. Note that, although "any one of Steps S104-1 to Step S104-4" is described here, each calculation method may be changed and used according to the priority order as described later.

Then, in Step S105, the score calculation part 113 assigns a score to each event, that is, records a score of each event. This is the end of the description of the overview of the processing of the present embodiment.

(Image of User Use)

Figure 4:
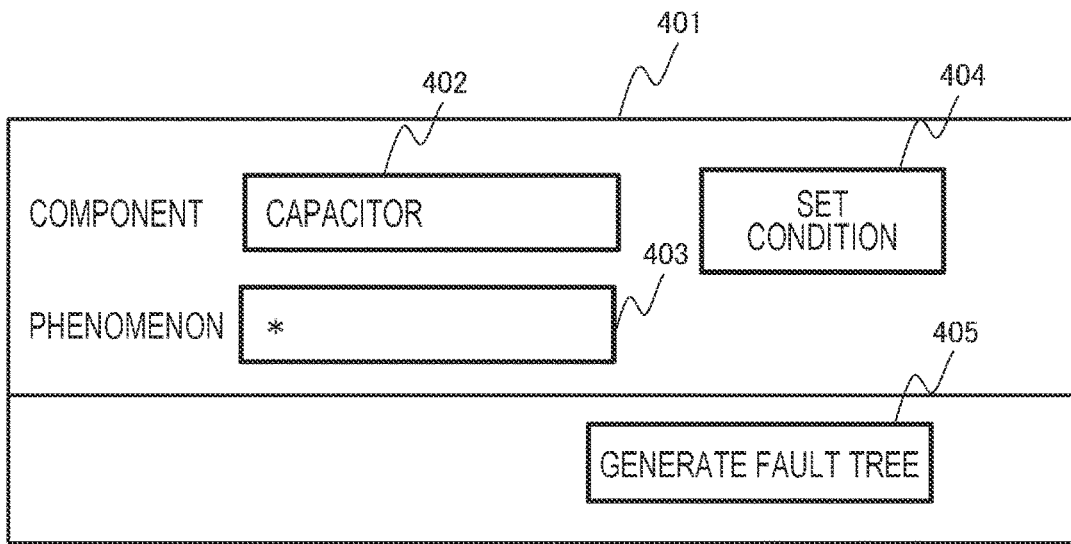
FIG. 4 is a diagram illustrating an example of a top event input screen and a field/product/use environment/influence degree input screen.

Here, input receiving processing in Step S101 will be described. First, a top event input screen 401 as illustrated in FIG. 4 is displayed on the output device 106 by the top event input part 109. The top event input screen 401 includes a component input field 402, a phenomenon input field 403, a condition setting button 404, and a fault tree generation button 405.

The output device 106 that outputs the input screen 401 handles, that is, outputs a top event as a set of a component name and a phenomenon name. For example, in a case where it is desired to analyze "capacitor rupture" as a top event, "capacitor" is a component, and "rupture" is a phenomenon. For this reason, the output device 106 receives "capacitor", which is input by the user, in the component input field 402 and "rupture" in the phenomenon input field 403. Further, in a case where the user desires to analyze all phenomena that may occur with respect to a component, the user inputs only the component, and the output device 106 receives these. In this case, the output device 106 receives "capacitor" in the component input field 402 and "*" in the phenomenon input field 403.

When the condition setting button 404 is pressed, the field/product/use environment/influence degree input section 110 displays a field/product/use environment/influence degree input screen 406. The field/product/use environment/influence degree input screen 406 includes a field input field 407, a product input field 408, a use environment input field 409, an influence degree input field 410, an others (free input) field 411, a score calculation check box 412, and a score calculation option 413.

Furthermore, the output device 106 receives input of a field, a product, a use environment, and influence degree in which a component is used via the field input field 407, the product input field 408, the use environment input field 409, and the influence degree input field 410, respectively. For example, when the field is "Y field", the product is "XX device", the use environment is "high humidity", and the influence degree is "product stop", the field input field 407, the product input field 408, the use environment input field 409, and the influence degree input field 410 are input. In the others (free input) field 411, viewpoints that affect a score in addition to the field, the product, the use environment, and the influence degree, if any, are input.

Further, the score calculation check box 412 is a check box for selecting whether or not to calculate a score. Furthermore, a system of calculating a score can be selected by using the score calculation option 413. This system, that is, condition includes four patterns of "without consideration for hierarchy—AND condition", "without consideration for hierarchy—OR condition", "with consideration for hierarchy—AND condition", and "with consideration for hierarchy—OR condition". Details of each condition will be described later.

Further, when the fault tree generation button 405 is pressed after a top event, a field, a product, a use environment, and influence degree are input on the screen, the fault tree generation part 111 generates a fault tree. Further, in a case where the score calculation check box 412 is checked, a score is calculated by the score calculation part 113, the score is assigned to the fault tree generated by the fault tree generation part 111, and a fault tree with the score is generated. In a case where the score calculation check box 412 is not checked, the score calculation in the score calculation part 113 is omitted, and a fault tree generated by the fault tree generation part 111 is output.

Figure 5:
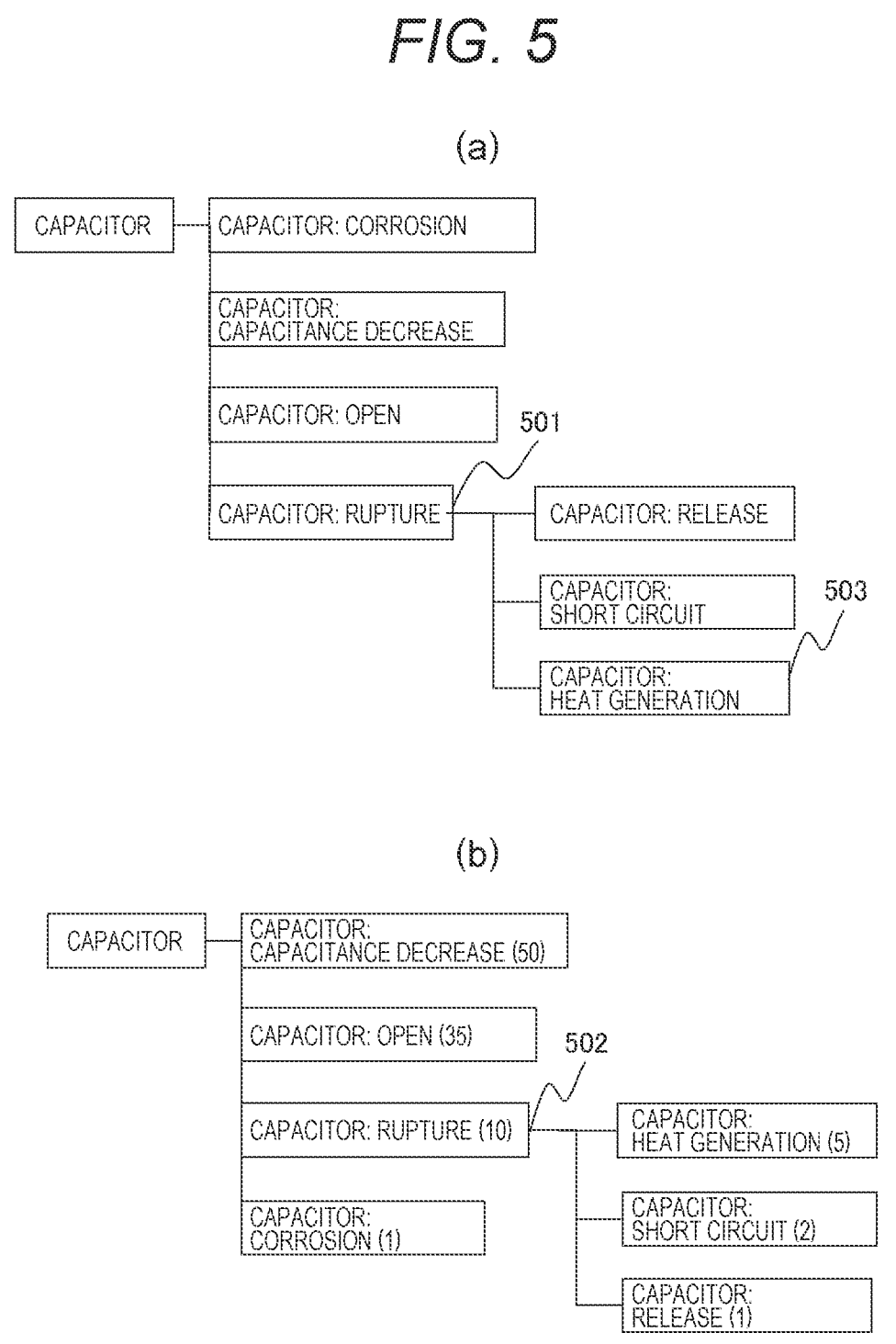

FIG. 5(*a*) illustrates a fault tree without a score, and FIG. 5(*b*) illustrates an example of a fault tree with a score. These are output examples when "capacitor" is input to the component input field 402 and "*" is input to the phenomenon input field 403. In FIG. 5(*a*), the capacitor is displayed as a top event, and "capacitor: corrosion", "capacitor: capacitance decrease", "capacitor: open", and "capacitor: rupture" are displayed as events occurring in the capacitor in a lower hierarchy of the top event.

Further, "capacitor: release", "capacitor: short circuit", and "capacitor: heat generation" are displayed as factors of "capacitor: rupture" in a lower hierarchy of "capacitor: rupture". In the present output device 106, an event (top event, intermediate event, or end event) is handled as a set of a component name and a phenomenon name, and is expressed in the form of "component name: phenomenon name". An event "capacitor: corrosion" indicates that corrosion occurs in the capacitor.

When "capacitor" is input in the component input field 402 and "rupture" is input in the phenomenon input field 403, "capacitor: release", "capacitor: short circuit", and "capacitor: heat generation" are displayed in a lower hierarchy with "capacitor: rupture" as a top event.

In addition, in the fault tree with a score in FIG. 5(*b*), a score is displayed at a position close to each event (for example, in right square brackets) in the form of "capacitor: capacitance decrease (50)". Events in hierarchies are sorted and displayed in descending order of scores. This makes it possible to quickly grasp an event having a high score. Here, regarding the display, only an event having a score of a certain numerical value or more may be displayed, or a color may be changed or an event may be displayed in bold. As described above, the fault tree is information indicating a hierarchical relationship between events.

(Fault Tree Generation Processing)

Fault tree generation processing in Step S102 in FIG. 13 will be described below with reference to FIGS. 6 to 9.

First, the fault tree generation part 111 searches the causal relationship DB 114 using a top event input by the user as a search keyword, and acquires one including a top event as an element among causal relationships. If there is no corresponding one, the processing ends. FIG. 6 is an example of a search result when the causal relationship DB 114 is searched using "component A: phenomenon A" which is a top event as a search keyword. For example, when a top event is "component A: phenomenon A", a causal relationship including "component A: phenomenon A" as illustrated in FIGS. 6(*a*) and 6(*b*) is retrieved.

Figure 8:
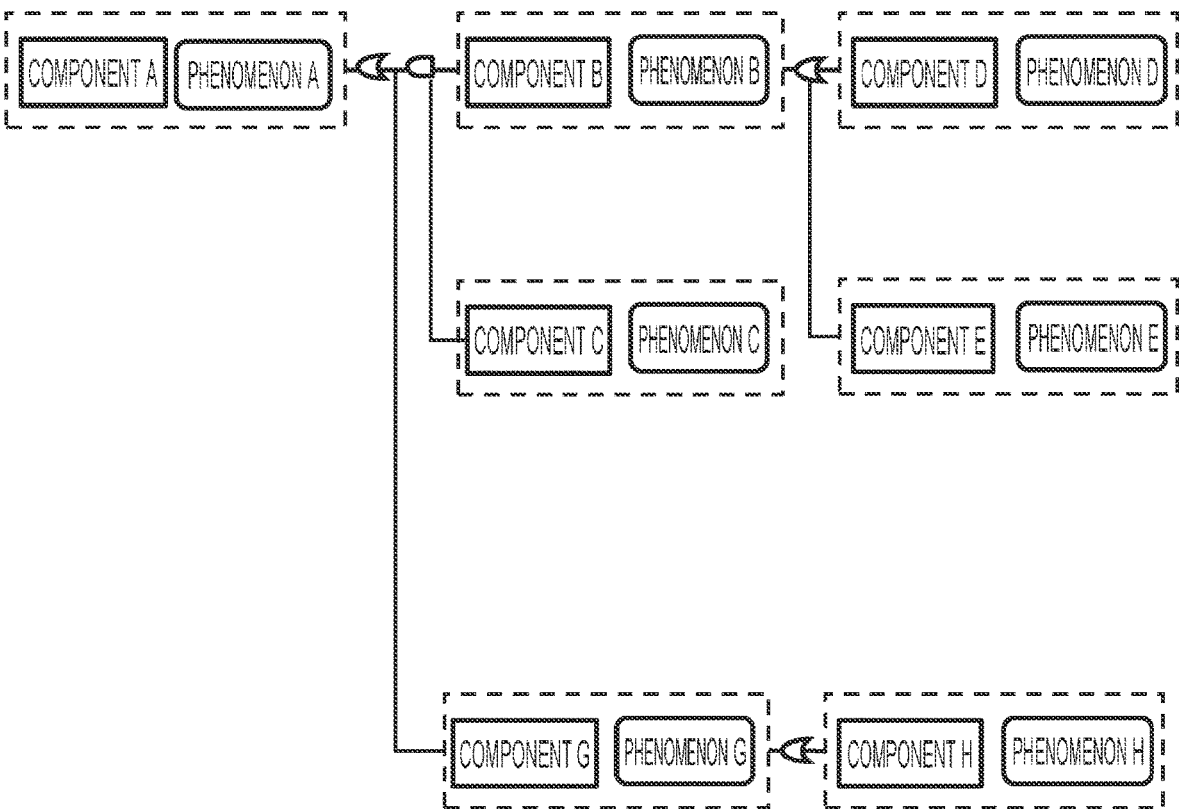
FIG. 8 is an example of a result during generation of a fault tree with a top event as a highest hierarchy.

FIG. 7 is an example of a result of extracting a causal relationship up to a top event from retrieved causal relationships. Here, extracting means that, in a case where there is another event (F in FIG. 6(*b*)) on Event A which is a top event in FIG. 6(*a*) as a result of the search, Event F is deleted and Event A is set to the top. Subsequently, the fault tree generation part 111 combines causal relationships up to the extracted top event to generate a fault tree with the top event as a highest hierarchy as illustrated in FIG. 8. Furthermore, the causal relationship DB 114 is searched using an intermediate event and an end event of the fault tree as search keywords, and one including the intermediate event and the end event as elements among the causal relationships is acquired.

Figure 9:
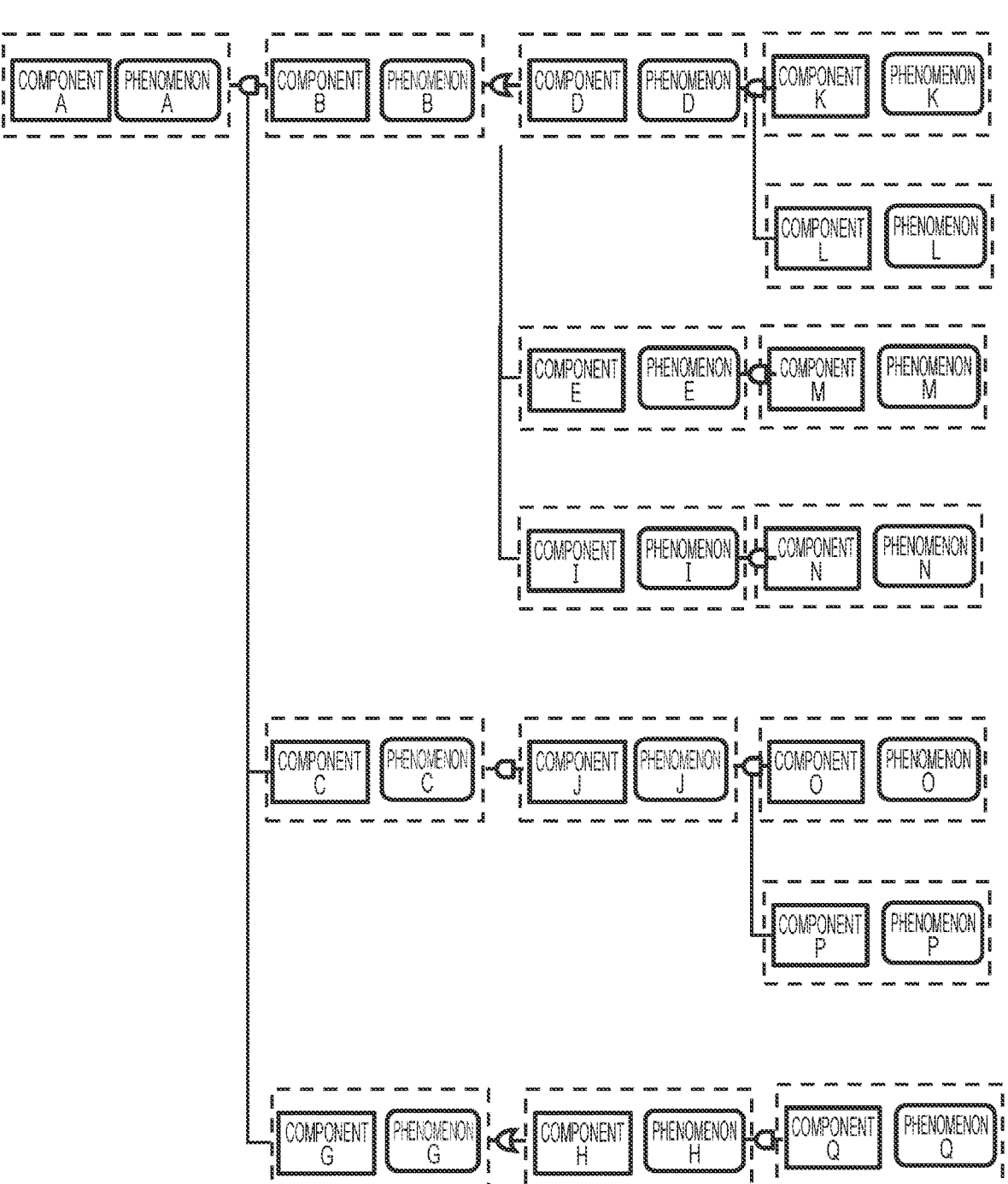
FIG. 9 is an example of a generation result of a fault tree in which a finally obtained top event is set as a highest hierarchy.

The fault tree generation part 111 extracts causal relationships up to the intermediate event and the end event from the retrieved causal relationships, and adds the extracted causal relationships to the original fault tree. The fault tree generation part 111 repeatedly executes this processing. FIG. 9 illustrates an example of a final fault tree generated in this manner. With the above processing, it is possible to automatically generate a fault tree for an input top event using causal relationships accumulated in the causal relationship DB 114.

In the present output device 106, a fault tree can be generated by receiving a component and a phenomenon, or only a component as a top event. Note that description of the above processing is an example of a case where both a component and a phenomenon are input. When only a component is input, the causal relationship DB 114 is searched using "component A: *" as a search keyword to generate a fault tree. The sign "*" indicates that no search keyword is identified.

(Score Calculation Method)

Next, details of Steps S103 to S104 in FIG. 13 will be described. That is, processing for executing a score calculation method using a generated fault tree will be described.

In the present processing, the score calculation part 113 calculates a score for each event in a fault tree generated by the fault tree generation part 111. The score is calculated from the number of co-occurrences of "event" and "information related to an event" in past defect information accumulated in the defect information DB 115 based on "information related to an event" input in the field/product/ use environment/influence degree input part 110.

Here, as described above, a calculation system (condition) includes four patterns of "without consideration for hierarchy—AND condition", "without consideration for hierarchy OR condition", "with consideration for hierarchy—AND condition", and "with consideration for hierarchy—OR condition", and can be selected by the score calculation option 413 described above. That is, in the present embodiment, for this purpose, first, in Step S103, the score calculation part 113 selects a calculation system (condition) according to a predetermined condition. Then, hereinafter, each score calculation system, that is, Steps S104-1 to S104-4 will be described.

First, in the case of "without consideration for hierarchy—AND condition" (S104-1), the search engine 112 searches the defect information DB 115 with a search condition of "(component of the event AND phenomenon of the event) AND (field AND product AND use environment AND influence degree)". Then, the score calculation part 113 sets the number of hits as a score. For example, in (component of the event AND phenomenon of the event), a component and a phenomenon constituting the event are combined under an AND condition. In (field AND product AND use environment AND influence degree), "information related to an event" input in the field/product/use environment/influence degree input part 110 is combined under an AND condition.

A combination of these (component of the event AND phenomenon of the event) and (field AND product AND use environment AND influence degree) under an AND condition is the condition of "without consideration for hierarchy—AND condition". For example, a score of an event "capacitor: rupture" 501 in the fault tree illustrated in FIG. 5 is calculated as described below, for example. When the field is "Y field", the product is "XX device", the use environment is "high humidity", and the influence degree is "product stop", a search condition is "(capacitor AND rupture) AND (Y field AND XX device AND high humidity AND product stop)". Defect information that hits under this condition includes "capacitor", "rupture", "Y field", "XX device", "high humidity", and "product stop". For this reason, the larger the number of hits, the more events have occurred in the past in this field, product, use environment, and influence degree, and the higher the score. In this example, when the number of hits is ten, the score is also ten (502).

In a case of the search condition of "with consideration for hierarchy—OR condition" (S104-2), "(component of the event AND phenomenon of the event) AND (field OR product OR use environment OR influence degree)" is set. In the "without consideration for hierarchy—AND condition", a condition for the second ( ) is (field AND product AND use environment AND influence degree), whereas in the present condition, the condition is (field OR product OR use environment OR influence degree). In a case where the number of pieces of defect information accumulated in the defect information DB 115 is small, the number of hits is considered to be zero if the inside of ( ) is set as an AND condition, and thus the inside of ( ) is set as an OR condition.

In the cases of "without consideration for hierarchy—AND condition" (S104-3) and "without consideration for hierarchy—OR condition" (S104-4), a hierarchical relationship of the fault tree is not considered, but in "with consideration for hierarchy—AND condition" and "with consideration for hierarchy—OR condition", a score is calculated in consideration of a hierarchical relationship.

Figure 10:
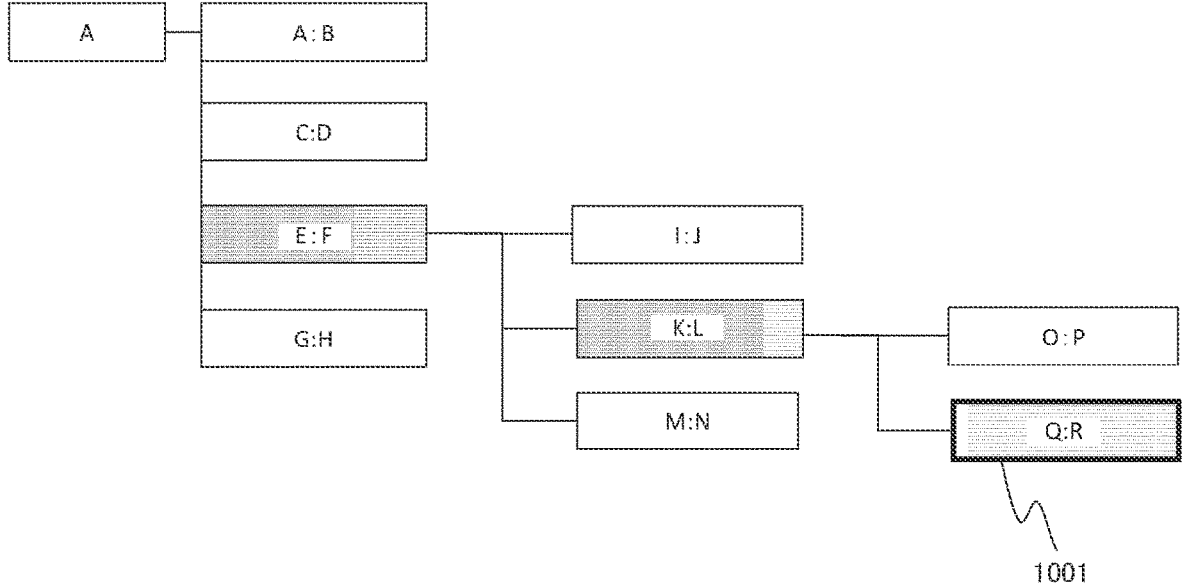
FIG. 10 is an example of a fault tree having a plurality of hierarchies.

In a case of the search condition of "with consideration for hierarchy—AND condition", "(component of the event in the above hierarchy AND phenomenon of the event in a higher hierarchy) AND (component of the event AND phenomenon of the event) AND (field AND product AND use environment AND influence degree)" is set. For example, a score of an event "capacitor: heat generation" 503 in the fault tree in FIG. 5 is calculated as described below. When the field is "Y field", the product is "XX device", the use environment is "high humidity", and the influence degree is "product stop", a search condition is "(capacitor AND rupture) AND (capacitor AND heat generation) AND (Y field AND XX device AND high humidity AND product stop)". In a case where there are a plurality of hierarchies, events of all higher hierarchies are added to the search condition. For example, a search condition at the time of calculating a score of an event "Q: R" 1001 of the fault tree in FIG. 10 is (E AND F) AND (K AND L) AND (Q AND R) AND (field AND product AND use environment AND influence degree).

As described above, the number of pieces of defect information in which both the event and an event in a higher hierarchy are described, that is, the number of defects in which the event and the event in a higher hierarchy are highly likely to have occurred simultaneously can be acquired as an event in a higher hierarchy is also added under an AND condition. It is considered that there is a higher possibility that the event is a cause of an event in a higher hierarchy as the number of such pieces increases. As described above, under the present condition, a score can be calculated in consideration of the possibility that the event is a cause of an event in a higher hierarchy.

Further, in a case of the search condition of "with consideration for hierarchy—OR condition", "(component of the event in the above hierarchy AND phenomenon of the event in a higher hierarchy) AND (component of the event AND phenomenon of the event) AND (field OR product OR use environment OR influence degree)" is set. A concept of this condition is similar to "with consideration for hierarchy—OR condition", and in "with consideration for hierarchy—AND condition", a condition of ( ) at the end is (field AND product AND use environment AND influence degree). On the other hand, in the present condition, (field OR product OR use environment OR influence degree) is set. In a case where the number of pieces of defect information accumulated in the defect information DB 115 is small, the number of hits is considered to be zero if the inside of ( ) is set as an AND condition, and thus the inside of ( ) is set as an OR condition.

Note that a synonym dictionary in which synonyms are registered in advance is used when search is performed with the search engine 112 under the above search condition. Then, a synonym of each keyword of a component, a phenomenon, a field, a product, a use environment, and influence degree is added under an OR condition, so that it is possible to cope with a fluctuation in expression of defect information.

Furthermore, in the above description, a score is calculated after a fault tree is generated, but the fault tree generation and the score calculation may be executed at least partially in parallel. For this purpose, the score calculation part 113 uses a part of a fault tree generated by the fault tree generation part 111 to calculate a score corresponding to the part. Then, the score calculation part 113 calculates a score of the entire fault tree by adding up scores of parts. Note that a part of a fault tree includes each event such as a top event.

As described above, the score calculation part 113 sequentially calculates scores, so that a processing speed can be shortened.

Furthermore, the score calculation part 113 may perform score calculation by using "without consideration for hierarchy—AND condition", "without consideration for hierarchy—OR condition", "with consideration for hierarchy—AND condition", and "consideration for hierarchy—OR condition" in this priority order as a calculation system (condition). In this case, in a case where a predetermined condition is satisfied, the score calculation part 113 changes a calculation system from a higher calculation system to a lower calculation system. For example, in a case where a score calculated by a higher calculation system is a predetermined value (for example, zero), the score calculation part 113 changes the calculation system to a lower calculation system and performs score calculation. Further, a calculation system (condition) may be changed according to input by the user.

Furthermore, in the cases of "without consideration for hierarchy—AND condition" and "without consideration for hierarchy—OR condition", the score calculation part 113 may calculate a score by multiplying by a numerical value (score) of each event of a root of a generated fault tree.

Then, in Step S105, the score calculation part 113 records a score of each event.

Second Embodiment

Figure 11:
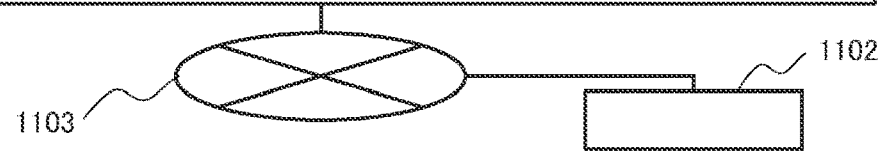
FIG. 11 is a diagram explaining a configuration of the failure factor priority order presentation device based on a use environment according to a second embodiment.

Next, a second embodiment of the present invention will be described. First, a configuration of the second embodiment is illustrated in FIG. 11. In the first embodiment, the user manually inputs a top event, a field, a product, a use environment, and influence degree in the top event input part 109 and the field/product/use environment/influence degree input part 110. On the other hand, in the second embodiment, a component extraction part 1109 is provided in place of the top event input part 109, and a field/product/use environment/influence degree extraction part 1110 is provided in place of the field/product/use environment/influence degree input part 110. The component extraction part 1109 automatically extracts a component name from a design document. In the first embodiment, as a top event, a component and a phenomenon, or a component can be input. However, in the second embodiment, a component is automatically extracted and input. The field/product/use environment/influence degree extraction part 1110 automatically extracts a field, a product, a use environment, and influence degree from a design document.

Figure 12:
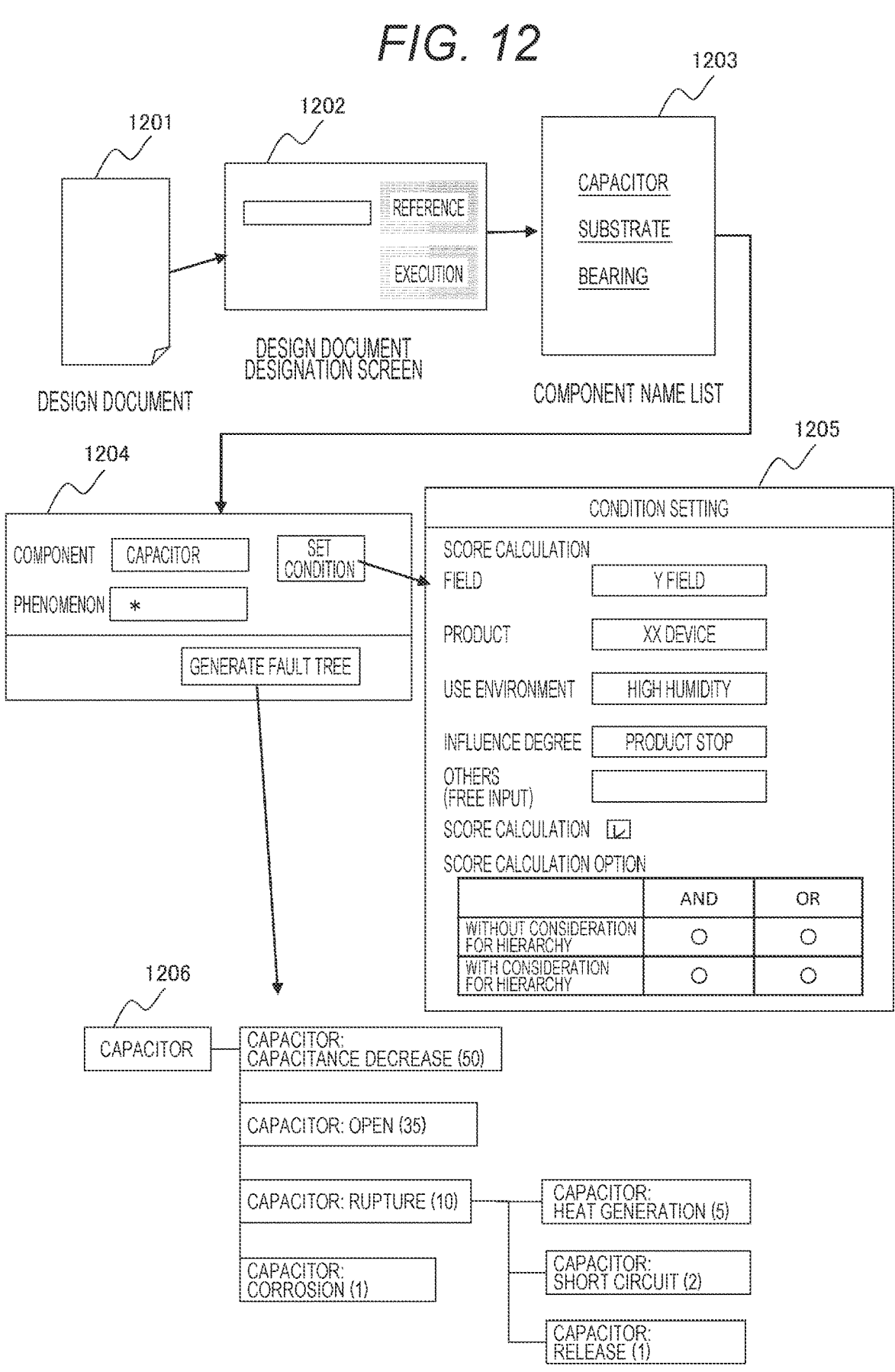
FIG. 12 is a diagram illustrating an image of user use of the second embodiment.

Here, FIG. 12 illustrates a use image by the user. First, an address on a PC storing a design document 1201 is input via a design document designation screen 1202, and an execution button is pressed. Then, in response to this pressing, from the design document, the component extraction part 1109 extracts a component name, and the field/product/use environment/influence degree extraction part 1110 extracts a field, a product, a use environment, and influence degree. The extracted component names are displayed as a component name list 1203. When a component name is selected from the component name list, a top event input screen 1204 is displayed in a state where the selected component name is automatically input. Furthermore, when a condition setting button is pressed from the top event input screen, a field/product/use environment/influence degree input screen 1205 is displayed in a state where the field, product, use environment, and influence degree extracted by the field/product/use environment/influence degree extraction part 1110 are automatically input. When a fault tree generation button is pressed on the top event input screen, a score-attached fault tree 1206 is generated and displayed.

By the above, work of inputting a top event, a field, a product, a use environment, and influence degree is reduced, and a score-attached fault tree is presented for a component to be designed at the stage of creating a design document to support quality improvement at the design stage.

According to the above embodiments, it is possible to consider a field, a product, a use environment, influence degree, and the like in which a component is used for an event included in a fault tree. For this reason, it is possible to improve efficiency of examination by evaluating and presenting priority of an event included in a fault tree and supporting determination of which one of a large number of failure factor candidates should be examined.

REFERENCE SIGNS LIST

101 failure factor priority order presentation device
102 terminal device
103 network
104 central control device
105 input device

106 output device
107 main storage device
108 auxiliary storage device

The invention claimed is:

1. A failure factor priority order calculation device for analyzing a failure factor in a product, the failure factor priority order calculation device comprising:
  an input part that receives, for each component constituting the product, input of a plurality of events including the component and a phenomenon occurring in the component or including the component, and receives information related to an event in each of the components;
  a fault tree generation part that generates a fault tree indicating a hierarchical relationship between the plurality of events related to the product; and
  a score calculation part that calculates, for each event constituting the fault tree, a score indicating priority of a response to the event according to the information related to the event,
  wherein the input part further receives input of influence degree of each event on another event, and
  wherein the score calculation part calculates the score further using the influence degree.

2. The failure factor priority order calculation device according to claim 1, further comprising a database that stores information on a failure for each product,
  wherein the score calculation part calculates the score by using number of co-occurrences of the event and the information related to the event in the database.

3. The failure factor priority order calculation device according to claim 2,
  wherein the score calculation part calculates the score by using at least one of (1) a first condition in which the number of co-occurrences is identified under an AND condition in consideration of a hierarchy of the fault tree, (2) a second condition in which the number of co-occurrences is identified under an OR condition in consideration of the hierarchy of the fault tree, (3) a third condition in which the number of co-occurrences is identified under an AND condition without considering the hierarchy of the fault tree, and (4) a fourth condition in which the number of co-occurrences is identified under an OR condition without considering the hierarchy of the fault tree.

4. The failure factor priority order calculation device according to claim 3, wherein the score calculation part calculates the score in order of the first condition, the second condition, the third condition, and the fourth condition.

5. A failure factor priority order calculation method using a failure factor priority order calculation device for analyzing a failure factor in a product, the failure factor priority order calculation method comprising:
  receiving, for each component constituting the product, input of a plurality of events including the component and a phenomenon occurring in the component or including the component, and receiving information related to an event in each of the components in an input part of the failure factor priority order calculation device;
  generating a fault tree indicating a hierarchical relationship between the plurality of events related to the product in a fault tree generation part of the failure factor priority order calculation device; and
  calculating, for each event constituting the fault tree, a score indicating priority of a response to the event according to the information related to the event in a score calculation part of the failure factor priority order calculation device, wherein the input part further receives input of influence degree of each event on another event, and wherein the score calculation part calculates the score further using the influence degree.

6. The failure factor priority order calculation method according to claim 5, wherein the failure factor priority order calculation device further includes a database that stores information on a failure for each product, and wherein the score calculation part calculates the score by using number of co-occurrences of the event and the information related to the event in the database.

7. The failure factor priority order calculation method according to claim 6, wherein the score calculation part calculates the score by using at least one of (1) a first condition in which the number of co-occurrences is identified under an AND condition in consideration of a hierarchy of the fault tree, (2) a second condition in which the number of co-occurrences is identified under an OR condition in consideration of the hierarchy of the fault tree, (3) a third condition in which the number of co-occurrences is identified under an AND condition without considering the hierarchy of the fault tree, and (4) a fourth condition in which the number of co-occurrences is identified under an OR condition without considering the hierarchy of the fault tree.

8. The failure factor priority order calculation method according to claim 7, wherein the score calculation part calculates the score in order of the first condition, the second condition, the third condition, and the fourth condition.

* * * * *